Figure 1:
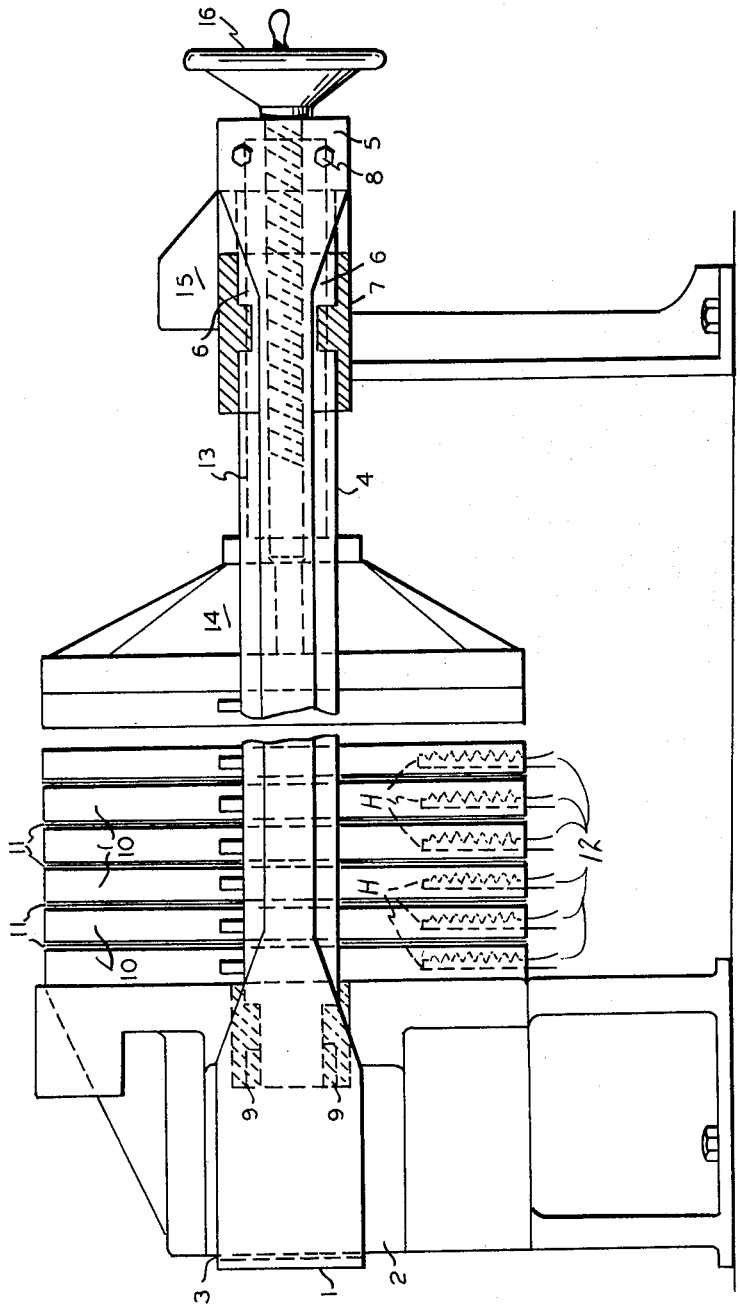

Feb. 8, 1966 H. C. MOSS 3,233,733
FILTER PRESS
Filed Jan. 31, 1962 2 Sheets-Sheet 1

FIG. I

INVENTOR.
HANSON CRESAP MOSS
BY
ATTORNEY

Feb. 8, 1966 H. C. MOSS 3,233,733
FILTER PRESS
Filed Jan. 31, 1962 2 Sheets-Sheet 2

INVENTOR.
HANSON CRESAP MOSS
BY
*Harry C. Braddock*
ATTORNEY

3,233,733
FILTER PRESS
Hanson Cresap Moss, Elkton, Md., assignor to E. I. du Pont de Nemours and Company, Wilmington, Del., a corporation of Delaware
Filed Jan. 31, 1962, Ser. No. 170,092
1 Claim. (Cl. 210—185)

This invention relates to improvements in construction of filters presses of the plate and frame type and particularly to a design for plate and frame filters which incorporates a means whereby the press "fails safe" when applied stress exceeds its load limit.

It is well known in the art to employ filter presses of the general type as described in Chemical Engineers' Handbook, Perry Third Edition, 1950, at p. 971 for removal of solid matter from fluids. Such presses employ multiple plates and frames which support the filtration medium selected and control the flow of fluid being filtered. The plates and frames are urged together in a horizontally-disposed arrangement, to effect fluid seals along their edges. The number of plates and frames used is limited only by the length of the side bars on which they are supported. Filter presses of the type described may be used for series filtration, that is, where the fluid successively passes through several or all of the plates and frames, or for parallel filtration wherein the fluid is divided into multiple streams each of which is given a single filtration and recombined into a single stream. The frames may also be fabricated with hollow cores through which a heat exchange medium may be circulated for control of filtration temperature. Alternatively, the frames may be equipped with electrical heating elements for the same purpose.

The force used in closing plate and frame filter presses must be sufficiently high to provide a seal at each plate-to-frame juncture. This force will vary depending on the operating pressure, which is partly a function of rate of flow and viscosity of the fluid being filtered and the nature of the filtration medium selected. To avoid the possibility of unfiltered fluid by-passing the filter and contaminating the filtered product, the filtration medium generally extends past the line of plate and frame contact and becomes a sealing gasket at each plate-to-frame juncture.

A serious problem in development of mechanical strain in press structure is encountered in the handling of hot liquids, particularly where variations in temperature occur as a normal part of the cycle of use. When the press is removed from service for filtration medium replacement or cleaning, it must be sealed completely by compression of the elements of the management before the hot fluid to be filtered is initially fed so as to avoid leaks. Due to thermal expansion of the plates and frames as they are heated by the hot fluid, the pressure may increase sufficiently to rupture structural members with consequent personnel hazards and expensive equipment down-time. These problems are further aggravated when highly viscous fluids are filtered, since the high pressure drop of viscous fluids through effective filtration media requires large counter-acting compressing forces on the plate-to-frame juncture to effect a seal.

It is an object of this invention to provide a novel, simple, economical an deffective means for preventing hazardous mechanical failure of plate and frame filter presses. More specifically, another object is to provide an elastic means for non-hazardous relief of transitional high strain as sealed filter presses are heated. It is a further object to provide a means for application of press-closing stress to the filter press head which minimizes tensile stress components in favor of compression components. Other objects will appear hereinafter.

These objects are accomplished by a modification of standard plate and frame filter presses to incorporate an elastic side bar member with an initial yield point below the safe loading limit of the head. Preferably, the elastic side bar member extends around the head so as further to protect the head from excessive tensile forces.

Figure 2:
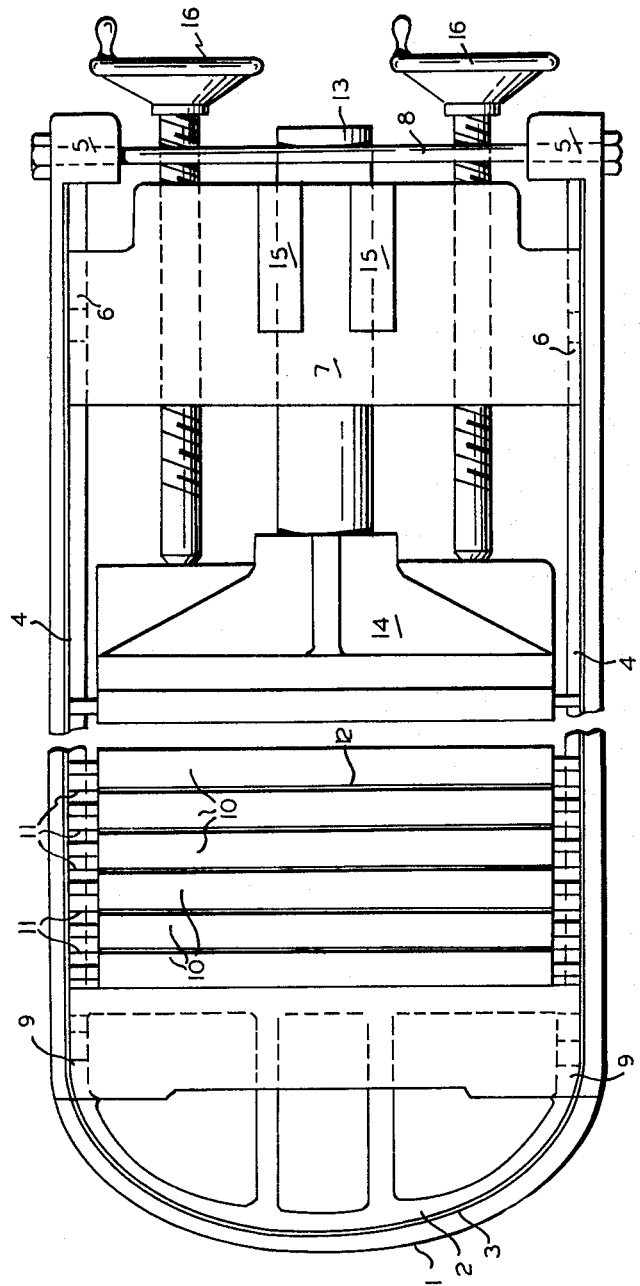
Figure 3:
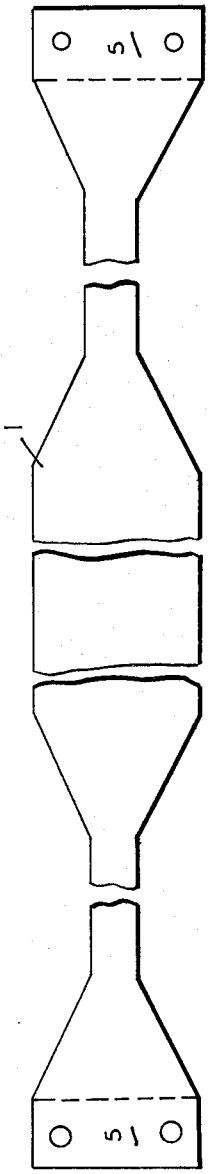

The invention can readily be understood and other objects and advantages will become apparent by reference to the drawings in which:

FIGURE 1 is a side elevation view of a standard plate and frame filter press modified in accordance with this invention, FIGURE 2 is a plan view of the same filter, and FIGURE 3 is a partial representation of the complete elastic side bar wrap-around member, which extends completely around three sides of the press and is reduced in cross sectional area for most of its length.

Referring to FIGURES 1 and 2, the wrap-around elastic side bar number 1 is bent to follow the curve of the press head 2 and a thin gasket 3 is inserted between side bar member 1 and head 2. The side bar member 1 extends as straight sections alongside the original side bars 4 and terminates with thickened sections 5 which overlap the ends of the original side bars 4. The original side bars 4 are slotted to form joggles at 6 to engage the screw standard or stationary stop member 7, and positive engagement of the joggles is maintained by bolts 8 which hold side bar member 1 firmly against side bars 4 and screw standard 7. Joggles on the original side bar at 9 are removed to allow the original side bar to "float" in engagement with the head 2.

In preparation for use, plates 10 and frames 11, with heater elements H, are assembled alternately with sheets of filter medium 12 inserted at each juncture. The assembly is then closed by forcing piston 13 against follower 14 by a mechanism not shown while restraining standard 7 through engagement of the closing mechanism with joggles 15. When the required closing force has been developed, locking screws 16 are brought to bear firmly against follower 14 and the force on piston 13 is removed.

The improved operation and effectiveness of the elastic side member in eliminating hazards due to thermal expansion in filter press operation are illustrated by the following examples.

Example 1

A filter press was used in this example which exactly duplicated that depicted in the drawings except that joggles 9 had not been removed, it did not have the elastic, wrap-around side bar members 1 and bolted-on cover plates were employed to maintain the side bar joggles at 6 and 9 in engagement with the head and screw standard. The press was rated to withstand 180 tons of force by hydraulic testing prior to use. Since it was to be used for filtration of a very viscous liquid, a closing force of 100 tons was used to assure a good seal between plates and frames. The frames were cored to receive a heat exchange medium. In this instance, water at 95° C. was used to preheat the press for service. Shortly after introduction of the hot process fluid to be filtered, which was also at 95° C., a portion of head 2 surrounding joggles 9 on one side of the press broke away. It was concluded that forces substantially in excess of 180 tons had been developed by thermal expansion of the plates. The original side bars 4, being insulated from the heated plates by a layer of air, did not heat up appreciably and therefore expanded little or none thermally. Observations on another identical filter press employing strain gauges to measure deflections, revealed that 400–500 micro-inches/inch of tensile strain developed in the head under the same conditions.

Example II

The modified filter press of this invention, as depicted in the drawings, was set up exactly as in Example I except that no filter medium was used. The absence of these heat-insulating, compressible gaskets between elements permitted rapid temperature build up in both plates and frames even without introduction of the hot process fluid and aggravated the generation of force by subsequent thermal expansion. The elastic side bars 1 had been designed with reduced cross section over most of their length which would yield elastically at a load of approximately 135 tons. Since the side bar member 1 was wrapped around the head, thus loading it compressionally rather than tensilely, this total loading was well beneath the rated strength of the head. Strain gauges were applied to the head, and careful measurements of the length of the side bars were made.

The press was closed at 100 tons and the plates (and frames) then heated to 95° C. by circulating hot water. The elastic side bars 1 elongated about 0.1% under the additional load generated by thermal expansion of plates and frames. It should be noted that side bars 1 are also insulated from the heat of the frames 10 so that this elongation was entirely due to application of mechanical force tending to separate head 2 and screw standard 7. The effectiveness of the wrap-around design in reducing the tensile component of force on the head is attested by development of only a negligible 15 micro-inches/inch of tensile strain in the head. When the press was opened it was found that the side bars had sustained a permanent elongation of about .02%.

The extemely low tensile loading of the head with the wrap-around design makes it much less critical than it would be otherwise to maintain the yield point of the elastic side bars at or near the designed 135 tons. The existence of other points of incipient failure, however, has prompted the adoption of a practice of elastic side bar replacement when accumulated permanent elongation exceeds about 0.75%. At greater than this amount of permanent elongation the force required to bring about elastic yielding will measurably exceed the designed 135 tons. The material of which the elastic side bar is constructed is not critical so long as it meets the functional requirements set forth herein. Illustrative of suitable materials for the construction of the elastic side bar member is a carbon steel having the AISI No. C1018, the physical properties of which are reported at page 32 in the Ryerson Data Book—Steel and Aluminum, by Joseph T. Ryerson and Son, Inc. (1960.)

It will be apparent that careful attention to the condition of the elastic side bars 1 as outlined above will provide an adequate margin of safety in a design which embraces conventional attachment of side bars to the head.

It is to be expected that modifications within the spirit of this invention will occur to those skilled in the art and all such are intended to fall within the scope of the following claims.

I claim:

In an improved filter press construction comprising a stationary head member, a movable driven thrust transmitting member mounted in operative alignment with said stationary head member for limited movement toward and away from said stationary head member to exert, in a position of its movement, a high compressive force on a plurality of plate and frame elements aligned, positioned between, and in engagement with said members, a stationary stop member mounted in operative association adjacent said movable thrust transmitting member, said stop member provided with an adjustable locking abutment constructed and arranged to engage said movable thrust transmitting member and cooperate with said stop member to lock said movable thrust transmitting member in a position in which the compressive force is exerted and maintained on the engaged plate and frame elements, a heating means operatively associated with the plate and frame units, said heating means when in operation causing additional force and displacement of the plate and frame elements due to thermal expansion thereof, the improvement comprising a safety connecting means operatively engaged with said stationary head member and said stationary stop member and possessing sufficient tensile strength to prevent relative movement between said members due solely to the reaction of the compressive force exerted upon the plate and frame elements by said members, said safety connecting means being constructed and arranged to yieldingly resist and absorb the additional force and displacement of the plate and frame elements due to thermal expansion thereof during operation of said heating means to prevent distortion and damage of the stationary head member and stationary stop member themselves due to the inreased forces, said safety connecting means consisting of an elongated reinforcing bar member in a U configuration and having two end portions and an intermediate portion, means rigidly securing said end portions to said stop member, said intermediate portion extending around said filter press, a part of said intermediate portion being in compressive engagement with the exterior of said stationary head member, and said elongated reinforcing bar being provided with a varied transverse cross section along its length such that maximum strength and surface area is provided for contact and engagement with said exterior of said stationary head member and for securing engagement with said stop member while the remainder of said cross section is reduced to permit the elastic deformation which prevents the damage to the stationary head member and stationary stop member due to thermal expansion of the plate and frame elements.

References Cited by the Examiner

UNITED STATES PATENTS 3,064,558  11/1962  Von Platen _____ 100—214

FOREIGN PATENTS

| 8,928 | 1889 | Great Britain. |
| 22,563 | 1889 | Great Britain. |
| 241,054 | 10/1925 | Great Britain. |

REUBEN FRIEDMAN, *Primary Examiner.*

HERBERT L. MARTIN, *Examiner.*